United States Patent
Hippauf et al.

(10) Patent No.: US 12,381,226 B2
(45) Date of Patent: *Aug. 5, 2025

(54) CATHODE UNIT AND METHOD FOR PRODUCING A CATHODE UNIT

(71) Applicants: Fraunhofer-Gesellschaft Zur Foerderung Angewandten Forschung E.V., Munich (DE); Technische Universitaet Dresden, Dresden (DE)

(72) Inventors: Felix Hippauf, Dresden (DE); Benjamin Schumm, Dresden (DE); Sebastian Tschoecke, Dresden (DE); Holger Althues, Dresden (DE); Stefan Kaskel, Dresden (DE); Susanne Doerfler, Dresden (DE)

(73) Assignees: Fraunhofer-Gesellschaft Zur Foerderung Angewandten Forschung E.V., Munich (DE); Technische Universitaet Dresden, Dresden (DE)

( * ) Notice: Subject to any disclaimer, the term of this patent is extended or adjusted under 35 U.S.C. 154(b) by 711 days.

This patent is subject to a terminal disclaimer.

(21) Appl. No.: 17/311,408

(22) PCT Filed: Dec. 17, 2019

(86) PCT No.: PCT/EP2019/085581
§ 371 (c)(1),
(2) Date: Jun. 7, 2021

(87) PCT Pub. No.: WO2020/127215
PCT Pub. Date: Jun. 25, 2020

(65) Prior Publication Data
US 2022/0029166 A1    Jan. 27, 2022

(30) Foreign Application Priority Data
Dec. 18, 2018  (DE) .................. 10 2018 222 129.4

(51) Int. Cl.
*H01M 4/62* (2006.01)
*H01M 4/02* (2006.01)
(Continued)

(52) U.S. Cl.
CPC ......... *H01M 4/623* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

| 7,352,558 B2 * | 4/2008 | Zhong | H01G 11/38 361/510 |
| 11,569,502 B2 * | 1/2023 | Kosaka | H01M 4/525 |

(Continued)

FOREIGN PATENT DOCUMENTS

| CA | 2465086 A1 * | 10/2004 | C04B 35/52 |
| CN | 104170125 | 11/2014 | |

(Continued)

OTHER PUBLICATIONS

Japanese Office Action.
(Continued)

*Primary Examiner* — Kevin M Bernatz
(74) *Attorney, Agent, or Firm* — Dunlap Bennett & Ludwig (57) ABSTRACT

A cathode unit for a solid-state battery and a method for producing the cathode unit. The cathode unit has a layer made of a composite material (2) which has an electrode material, a solid electrolyte material, an electrically conductive conducting additive and polyetrafluoroethylene as a binder. The composite material contains less than 1 wt. %

(Continued)

polyetrafluoroethylene and the polyetrafluoroethylene is present, at least in part, as fibrillated polyetrafluoroethylene.

14 Claims, 5 Drawing Sheets

(51) Int. Cl.
| | | |
|---|---|---|
| H01M 4/04 | (2006.01) | |
| H01M 4/131 | (2010.01) | |
| H01M 4/1391 | (2010.01) | |
| H01M 4/505 | (2010.01) | |
| H01M 4/525 | (2010.01) | |
| H01M 4/58 | (2010.01) | |
| H01M 10/0525 | (2010.01) | |
| H01M 10/0562 | (2010.01) | |
| H01M 10/0585 | (2010.01) | |

(52) U.S. Cl.
CPC ..... *H01M 4/1391* (2013.01); *H01M 10/0525* (2013.01); *H01M 10/0562* (2013.01); *H01M 10/0585* (2013.01); *H01M 2004/028* (2013.01); *H01M 4/505* (2013.01); *H01M 4/525* (2013.01); *H01M 4/5825* (2013.01); *H01M 4/625* (2013.01); *H01M 2300/0068* (2013.01)

(56) References Cited

U.S. PATENT DOCUMENTS

| | | | | |
|---|---|---|---|---|
| 12,100,858 | B2* | 9/2024 | Hippauf | H01M 50/411 |
| 2007/0287062 | A1* | 12/2007 | Tsukuda | H01M 50/4295 |
| | | | | 429/129 |
| 2011/0111295 | A1* | 5/2011 | Yamada | H01M 4/485 |
| | | | | 252/182.1 |
| 2013/0097854 | A1 | 4/2013 | Kato et al. | |
| 2014/0346046 | A1* | 11/2014 | Andelman | H01G 11/56 |
| | | | | 204/674 |
| 2016/0248120 | A1 | 8/2016 | Yamada et al. | |
| 2018/0145312 | A1* | 5/2018 | Koike | H01M 4/623 |
| 2019/0367676 | A1* | 12/2019 | Kanada | H01M 8/1039 |
| 2020/0083541 | A1* | 3/2020 | Swiegers | H01M 8/0239 |
| 2020/0185768 | A1* | 6/2020 | Kang | H01M 10/0562 |
| 2022/0006071 | A1* | 1/2022 | Petrowsky | H01M 50/426 |
| 2022/0029242 | A1* | 1/2022 | Hippauf | H01M 10/0525 |
| 2022/0393176 | A1* | 12/2022 | Lim | H01M 4/139 |
| 2023/0231182 | A1* | 7/2023 | Yamada | H01M 10/052 |
| | | | | 429/316 |
| 2024/0421315 | A1* | 12/2024 | Inoue | H01M 10/0562 |
| 2024/0421317 | A1* | 12/2024 | Yamada | H01M 10/0525 |

FOREIGN PATENT DOCUMENTS

| | | |
|---|---|---|
| CN | 104364942 | 2/2015 |
| CN | 104704651 | 6/2015 |
| CN | 105 489 931 | 4/2016 |
| DE | 10 2012 203 019 | 8/2013 |
| DE | 10 2017 208 220 | 11/2018 |
| EP | 1 644 136 | 4/2006 |
| EP | 28 20 699 | 1/2015 |
| JP | 62-254367 | 11/1987 |
| JP | 62-254367 A | 11/1987 |
| JP | 2012-99315 A | 5/2012 |
| JP | 2012099315 | 5/2012 |
| JP | 2012-164571 | 8/2012 |
| JP | 2012-164571 A | 8/2012 |
| JP | 2013/089321 | 5/2013 |
| WO | 2014/041108 | 3/2014 |

OTHER PUBLICATIONS

Chinese Office Action.
International Search Report.
German Examination Report.
Chinese Office Action with translation.
Denka Black Li, product information, retrieved 2022 from https://www.denka.co.jp/product/detail_00026/.
Yamaguchi et al, "Structural Analysis of the Sulfide Solid Electrolyte Glass Obtained by Different Production Methods", Spring-8/SACLA Research Report—J-Stage, Section B, Jan. 25, 2018, DOI:10.18957/rr.6.1.101, p. 101 and part of p. 102.
TeflonTM PTFE 6CN X product information, 2016, retrievable from https://www.teflon.com/en/-/media/files/teflon/teflon-ptfe-6cn-x-product-info.pdf?rev=973e0a379c144078851ecdb6968e3b63&hash=C8EE4CC32BAB6CD83B544C040E70F8C7#:~:text=Teflon%E2%84%A2%20PTFE%206CN%20X%20is%20designed%20for%20processing%20at, %2C%20Grade%202%2C%20Class%20C.
Large, product information, retrieved 2022 from https://jp.large.net/news/8ku43mw.html.
Meigen, Deng. Research on Electrode Materials for Electrochemical Capacitors, first edition. University of Science and Technology of China Press, Oct. 2009.

* cited by examiner

CATHODE UNIT AND METHOD FOR PRODUCING A CATHODE UNIT

BACKGROUND OF THE INVENTION

Solid state batteries represent a very promising further development of lithium ion batteries. With solid state batteries, a lithium ion conductor (or sodium ion conductor) present as a solid state body is used as the electrolyte instead of a liquid electrolyte system. It simultaneously serves as an ion conductor between active material particles and as an ion conductive separator between the anode and the cathode. What is important here is the possibility of a large area processing of powdery electrode mixtures and the formation of an intimate contact surface between the solid electrolyte and active materials having as many contact points as possible and as few hollow spaces as possible.

Solid state batteries can inter alia be categorized with reference to the electrolyte class used (oxide, sulfide, and polymer based). Oxide solid electrolytes have a high chemical and mechanical stability. A processing into non-porous and thin electrodes or solid electrolyte membranes, however, represents a great challenge due to the high sintering temperatures. Sulfide electrolyte materials can also hardly be deposited over large areas. Different binder solvent mixtures are used for the anode, cathode, and electrolyte layer for the application by means of wet chemical processes as described, for example, in US 2016/248120 A1 since otherwise on a layer application, a solvation of the layer therebelow can occur. The comparatively high binder content of several weight percent or mass percent and higher electrical and ionic resistances resulting therefrom are disadvantageous in such processes.

SUMMARY OF THE INVENTION

It is therefore the underlying object of the present invention to provide a cathode unit and a method of producing same that overcomes said disadvantages, that is enables a large area production of the cathode unit with electrical and ionic resistances that are as low as possible.

This object is achieved in accordance with the invention by a cathode unit and method of making as set forth in the claims.

A cathode unit for a solid state battery, preferably an alkaline ion solid state battery or lithium battery or sodium battery, has a layer of a composite material. The composite material has an electrode material, a solid electrolyte material, an electrically conductive additive, and polytetrafluoroethylene (PTFE) as a binding agent. The composite material has less than 1 weight percent polytetrafluoroethylene and the polytetrafluoroethylene is at least partially present as a fibrillated polytetrafluoroethylene.

By using fibrillated polytetrafluoroethylene as the binding agent, a binding agent use can be reduced so that only small amounts of less than 1 weight percent polytetrafluoroethylene of the cathode unit are necessary and the electrical properties are therefore improved. The composite material is typically solvent free to enable a simpler processing and a simpler application and the formation of a free-standing film.

The cathode unit can have a current collector composed of an electrically conductive material on which the layer of a composite material is applied. Any material should here be understood under the term "electrically conductive" that has an electrical conductivity of more than $10^5$ S/m at room temperature, i.e. at 25° C. Alternatively or additionally, the layer of a composite material can also be electrically conductive in that a proportion of the conductive additive that is typically likewise electrically conductive is selected as correspondingly high.

Provision can be made that the polytetrafluoroethylene in the composite material is present as an at least partially monoaxially and/or biaxially oriented polytetrafluoroethylene to set the mechanical properties as desired. Provision can naturally also be made that the polytetrafluoroethylene is present as a completely monoaxially or completely biaxially oriented or aligned polytetrafluoroethylene.

The composite material can comprise the electrode material in a quantity of 60 weight percent to 99 weight percent, preferably to 100 percent. The composite material typically comprises at least 0.1 weight percent polytetrafluoroethylene to have sufficient binding agent available. The composite material preferably comprises less than 0.5 weight percent polytetrafluoroethylene, particularly preferably between 0.1 weight percent and 0.4 weight percent.

The electrode material can comprise sulfur, lithium sulfide ($Li_2S$), a lithium metal oxide, a sodium metal oxide, or a mixture thereof to form a sulfide cathode, for example. The electrically conductive electrode material can in particular comprise a transition metal oxide, preferably $LiCoO_2$, $LiNiO_2$, $LiNi_{1-x}Co_xO_2$, $LiFePO_4$, $LiMnO_2$, $LiMn_2O_4$, $Li_2Mn_3NiO_8$, $LiNi_xCo_yMn_zO_2$, $LiNi_xCo_y$—$Al_2O_2$ (where x+y+z=1), $Li_4Ti_5O_{12}$, or $Li_2FeSiO_4$ or a mixture thereof. Corresponding analogs containing sodium, preferably $Na_2S$, $Na_xMnO_2$, $Na_3V_2(PO_4)_3$, $NaFePO_4$, $Na_2FePO_4F$, $NaNiMnO_2$, $Na_2TiO_7$ and/or $NaTi_2(PO_4)_3$, can equally be used. Provision can also be made that multilayer oxides of the type $AMO_2$ are used as the electrode material, where A=Li, Na; M=Co, Mn, Ni. Said different materials can also generally be combined with one another to form the electrode.

The solid electrolyte material can comprise a material composed of the system $Li_2S$—$P_2S_5$, $Li_2S$—$GeS_2$, $Li_2S$—$B_2S_3$ $Li_2S$—$SiS_2$, $Li_5PS_6Cl$, $Li_2S$—$P_2S_5$—LiX (X=Cl, Br, I), $Li_2S$—$P_2S_5$—$Li_2O$, $Li_2S$—$P_2S_5$—$Li_2O$-LiI, $Li_2S$—$SiS_2$-LiI, $Li_2S$—$SiS_2$—LiBr, $Li_2S$—$SiS_2$—LiCl, $Li_2S$—$SiS_2$—$B_2S_3$-LiI, $Li_2S$—$SiS_2$—$P_2S_5$-LiI, $Li_2S$—$P_2S_5$—$Z_mS_n$ (where m and n are whole numbers and M is selected from P, Si or Ge), $Li_2S$—$SiS_2$—$Li_3PO_4$, $Li_2S$—$SiS_2$-$Li_pMO_q$ (where p and q are whole numbers and M is selected from P, Si or Ge), $Na_2S$—$P_2S_5$, $Na_2S$—$GeS_2$, $Na_2S$—$B_2S_3$, $Na_6PS_5Cl$, $Na_2S$—$SiS_2$, $Na_2S$—$P_2S_5$—NaX (X=Cl, Br, I), $Na_2S$—$P_2S_5$—$Na_2O$, $Na_2S$—$P_2S_5$—$Na_2O$-NaI, $Na_2S$—$SiS_2$-NaI, $Na_2S$—$SiS_2$—NaBr, $Na_2S$—$SiS_2$—NaCl, $Na_2S$—$SiS_2$—$B_2S_3$-NaI, $Na_2S$—$SiS_2$—$P_2S_5$-NaI, $Na_2S$—$P_2S_5$—$Z_mS_n$ (where m and n are whole numbers and M is selected from P, Si or Ge), $Na_2S$—$SiS_2$—$Na_3PO_4$, $Na_2S$—$SiS_2$-$Na_pMO_q$ (where p and q are whole numbers and M is selected from P, Si or Ge) or a mixture thereof. Lithium can generally be replaced with sodium in all the compounds named in this application. The solid electrolyte material is typically present in the powder mixture at between 1 weight percent and 35 weight percent. Carbon nanotubes, black carbons, graphite, graphene, and/or carbon nanofibers can be contained as conductive additives in the composite material at between 1 weight percent and 5 weight percent. The solid electrolyte material is typically an electrochemically active material. The conductive additive can be an electrochemically inactive material.

The electrode material can comprise a protective layer that is applied to particles of this material. This protective layer should prevent side reactions between the solid electrolyte material and the electrode material. The protective layer can comprise $Li_2O$—$ZrO_2$ or other metal oxides, for example. Every particle of the electrode material can have a protective layer having a thickness of typically 2-5 nm.

The electrically conductive current collector typically comprises an electrical conductive material, preferably aluminum, or it is completely formed from this material. Alternatively or additionally, the current collector can be formed as a current collector layer, in particular a planar current collector, having a preferably double-sided coating, as an expanded metal, or as a current collector layer provided as foam, as fiber fabric, as non-crimp fiber or provided with a primer layer. The primer layer can here likewise be planar.

In a method of producing a cathode unit for a solid state battery, a powder mixture is produced from an electrode material, a solid electrolyte material, an electrically conductive additive, and polytetrafluoroethylene as a binding agent. The powder mixture here has a proportion of less than 1 weight percent of polytetrafluoroethylene. At least partially fibrillated polytetrafluoroethylene is formed in the powder mixture by the action of shear forces on the powder mixture. The powder mixture is subsequently shaped into a flexible composite layer. The flexible composite layer is preferably applied to an electrically conductive current collector to form the cathode unit. Provision can also be made to subsequently compact the flexible composite layer and/or the current collector.

A simple processing is ensured by a powder mixture, by which a material should be understood that is present in granulate form and is composed of a plurality of small particles having a size of up to 15 μm or is a granular or fragmentary mix or bulk material. The powder mixture can be present in dry form to simplify the handling. In addition, the powder mixture can also not be pourable in the sense of the standard DIN EN ISO 6186. "Dry" should be understood within the framework of this document such that components of the powder mixture are present as solid state bodies free of liquids or materials present in a liquid aggregate state. The powder mixture can be solvent-free, that is compiled without solvent. A "flexible composite layer" should be understood as a composite layer that can be bent or folded and unfolded by up to 180° without breaking at room temperature. A bending radius is particularly 90 μm to 100 μm, particularly preferably 100 μm.

The formation of the at least partially fibrillated polytetrafluoroethylene can take place by grinding, blending in a worm shaft or in a calender rolling device, kneading device, pestling device, or a combination of said methods to ensure an efficient fillibration. The formation of the at least partially fillibrated polytetrafluoroethylene typically takes place at room temperature; however, to reach a binder content of less than 0.5 weight percent, the formation is preferably carried out at elevated temperatures of 60° C. to 100° C., particularly preferably at 90° C. to 100° C., in particular at 100° C. The polytetrafluoroethylene can, however, also be present in completely fillibrated form.

The shaping of the powder mixture into the flexible composite layer typically takes place by rolling, pressing, or extrusion. However, a combination of said methods can also be used.

The application of the flexible composite layer to the electrically conductive current collector layer is typically carried out at temperatures between 60° C. and 120° C., preferably 80° C. to 100° C.

The method described can be used to produce the described cathode, i.e. the described cathode can be produced by the described method.

A solid state battery or lithium battery in accordance with the invention includes a cathode unit having the described properties.

DESCRIPTION OF THE DRAWINGS

Embodiments of the invention are shown in the drawings and will be explained in the following with reference to FIGS. 1 to 10.

There are shown.

DETAILED DESCRIPTION OF THE INVENTION

Figure 1:
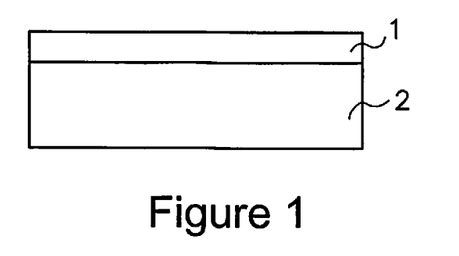
FIG. 1 a schematic lateral view of a cathode.

An electrically conductive current collector layer 1 composed of aluminum as a substrate film or carrier film having a first electrode 2 that form a cathode unit is shown in a schematic lateral view in FIG. 1. The first electrode 2 is formed from a composite material in powder form in the embodiment shown. The composite material has 85 weight percent lithium nickel manganese cobalt (NCM), 13 weight percent of a solid electrolyte material such as lithium $Li_2S$—$P_2S_5$, 2 weight percent of electrically conductive carbon nanotubes as a conductive additive, and 0.1 weight percent polytetrafluoroethylene as a binding agent. The binder content here relates to the total mass with a ratio of NCM:C:SE of 85::2:13 (SE should mark the solid electrolyte as an abbreviation for it). The composite material obtained is powdery, dry, and solvent-free, but not pourable. The composite material can be blended in a mortar. Shear forces are exerted on the mixture forming the composite material or on the powder mixture in this process that effect a fibril formation along the force vector. In a following step, the composite material is rolled on a plate to a desired layer thickness using a roller and is laminated onto the carrier film 1. The carrier film 1 has a thickness of less than 20 μm and may be provided with a carbon primer. A final shaping of the cathode unit takes place by stamping or laser cutting.

The composite material can alternatively be added directly into a calender gap as a powder mixture or a bulk material without solvent additives. As described in German patent application DE 10 2017 208 220, different rotational speeds of the two calender rollers are used, for example in a ratio of 10:9 to 10:4. A ratio of the rotational speeds of 2:1, e.g. 10 mm/s:5 mm/s or 20 mm/s to 10 mm/s is advantageous. A shear force is hereby exerted on the composite material in the gap that effects a fibril formation along the roller running direction. A layer formation is produced on the roller rotating faster. In a following step, the layer is laminated onto the substrate film 1 and a final shaping takes place by stamping or laser cutting. The formation of a film in the calender gap moreover already enables a great compacting of the involved layers during the film formation. What is important for this is particle size distributions of the powdery materials that are used for the composite material that are coordinated with one another to fill gaps of the large particles with smaller particles as efficiently as possible and to keep porosity low. The film therefore has a density prior to pressing of 1.7-1.9 g/cm$^3$, which corresponds to a porosity of 50 to 55 percent. After the pressing or compacting, the density is 3.5 g/cm$^3$ as a rule and the porosity at a value of up to 10 percent approaches the ideal value of 0 percent porosity.

A processing takes place in an advantageous manner at elevated temperatures between 60° C. and 100° C., which has the consequence of a considerable reduction of the required binder agent content or binder content. The cathode unit hereby obtained thus has the layer sequence of substrate film 1-first electrode 2. The first electrode 2 typically has a structure as follows in its composition: Cathode material 60 to 99 weight percent, solid electrolyte material 13 to 35 weight percent, conductive additive 2 to 5 weight percent, where the binding agent (polytetrafluoroethylene) makes up 0.1 to 1 weight percent of the total mass. The already mentioned pressing is typically finally carried out as a process step. This is done at a pressure of 290 MPa to 450 MPa, preferably 300 MPa, to ensure a flow capability of the electrolyte. All the processing steps in which the solid electrolyte material is involved preferably take place under protective gas, for example a noble gas, preferably argon, or nitrogen, or dry air having a dew point below −50° C.

Figure 2:
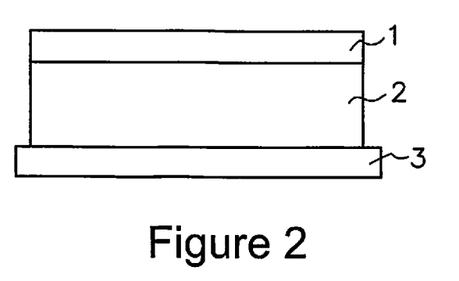
FIG. 2 the cathode having a solid electrolyte membrane in a representation corresponding to FIG. 1.

The cathode unit of carrier film 1 and first electrode 2 is shown in FIG. 2 in a view corresponding to FIG. 1, with now a solid electrolyte membrane 3 being arranged in direct contact, that is in immediately touching contact, at a side or surface opposite the first electrode 2 to which the carrier film 1 is attached in direct contact as a current collector layer. While the carrier film 1 and the first electrode 2 are disposed in alignment above one another, that is have identical dimensions except for their respective thicknesses, the solid electrolyte membrane 3 is wider than the first electrode 2. Repeating elements are provided with identical reference numerals in this Figure and also in the following Figures.

Figure 3:
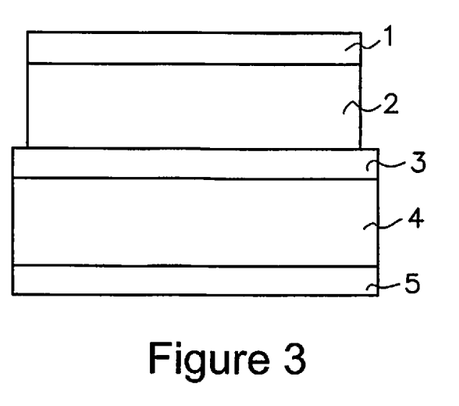
FIG. 3 the cathode provided with the solid electrolyte membrane and an anode in a representation corresponding to FIG. 1.

FIG. 3 shows in a view corresponding to FIGS. 1 and 2 a solid state battery in which, in addition to the structure shown in FIG. 2, an anode unit is attached to a side disposed opposite a side of the solid electrolyte membrane 3. The anode unit is formed from a second electrode 4 and a second substrate film 5 as a second current collector layer that are in turn in direct contact with one another. The second electrode 4 is in direct contact with the solid electrolyte membrane. The solid electrolyte membrane the second electrode 4, and the second carrier film 5 are arranged in alignment above one another, with the second carrier film 5 having the smallest thickness, the second electrode 4 having the largest thickness, and the thickness of the solid electrolyte membrane 3 being between the thickness of the second electrode 4 and the second carrier film 5. The capacitances are typically coordinated with one another, from which the thicknesses result. The first electrode can, for example, have a thickness of 100 μm, the second electrode as the lithium anode, for example, up to 10 μm. The thicknesses of the first carrier film 1 and of the second carrier film 5 can also be identical. The thickness of the first electrode 2 is greater than the thickness of the solid electrolyte membrane 3 that in turn has a greater thickness than the first carrier film 1. Battery electrodes for primary and secondary batteries can be produced with the described method, preferably with a lithium ion compound or a sodium ion compound, solid state supercapacitor electrodes, or layers of moisture-sensitive or solvent-sensitive materials, that is sulfide electrolytes of all kinds.

Figure 4:
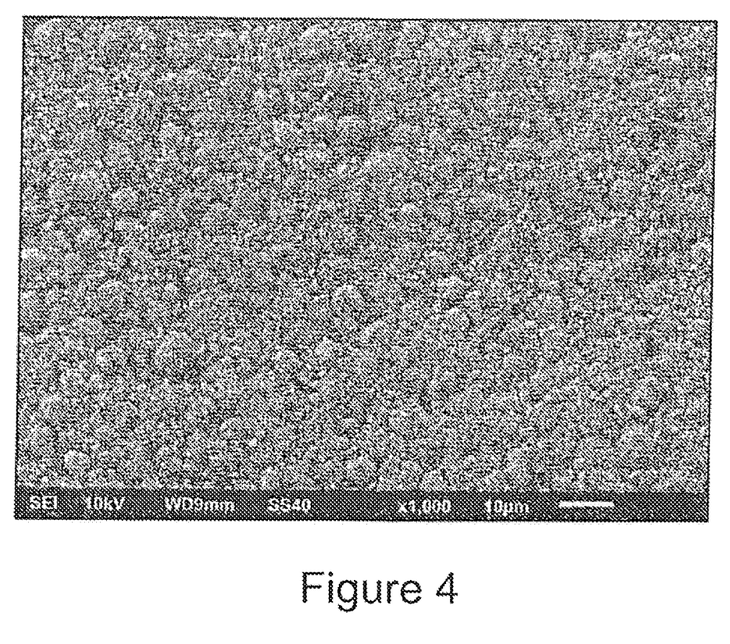
FIG. 4 a scanning electron microscope photograph of a dry film of a composite material.

FIG. 4 shows a scanning electron microscope photograph (SEM photograph) of a dry film composed of NCM solid electrolyte (SE), carbon fibers (CNF) in a mass ratio of 85:13:2 and 0.3 weight percent of the total mass polytetrafluoroethylene (PTFE).

Figure 5:
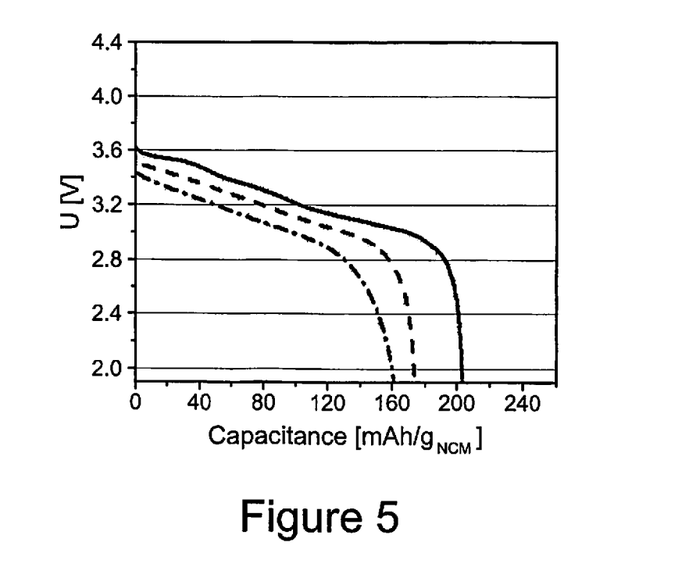
FIG. 5 a discharge voltage profile of a test cell having a binder content of 0 weight percent.
Figure 6:
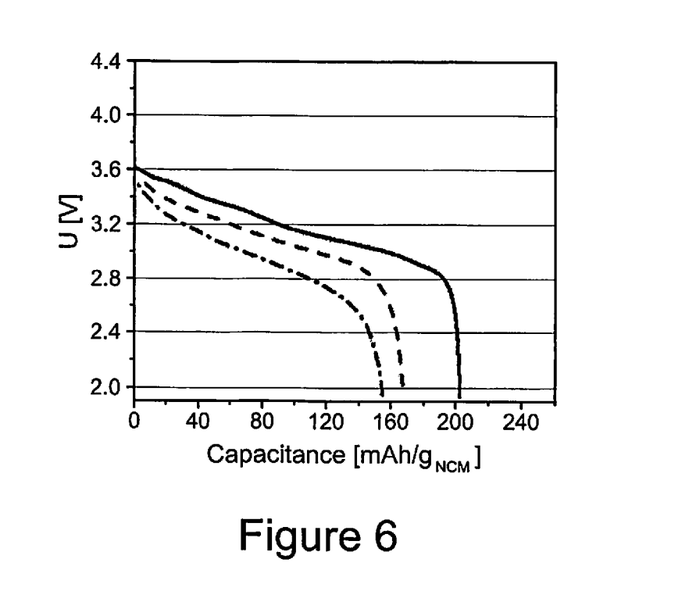
FIG. 6 the discharge voltage profile of the test cell having a binder content of 0.1 weight percent in a representation corresponding to FIG. 5.
Figure 7:
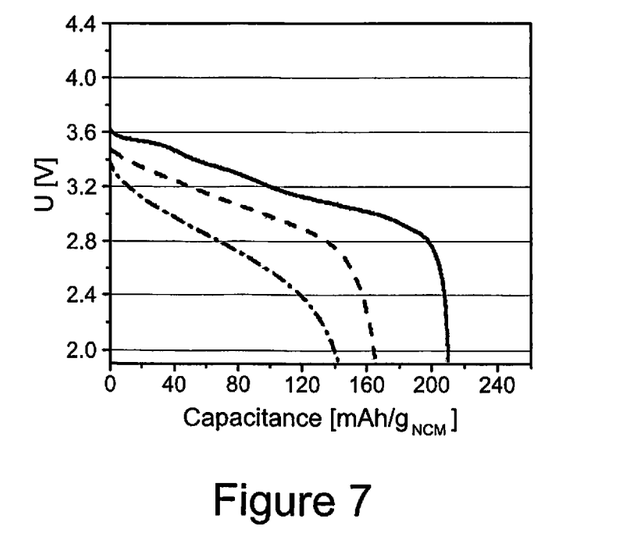
FIG. 7 the discharge voltage profile of the test cell having a binder content of 0.3 weight percent in a representation corresponding to FIG. 5.
Figure 8:
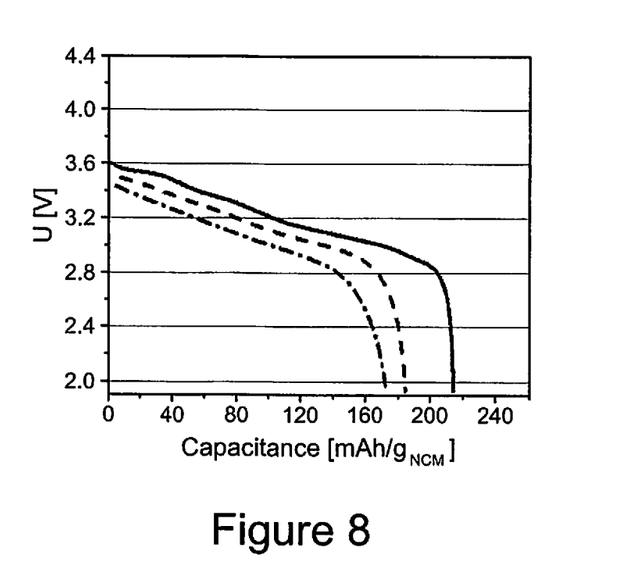
FIG. 8 the discharge voltage profile of the test cell having a binder content of 0.7 weight percent in a representation corresponding to FIG. 5.
Figure 9:
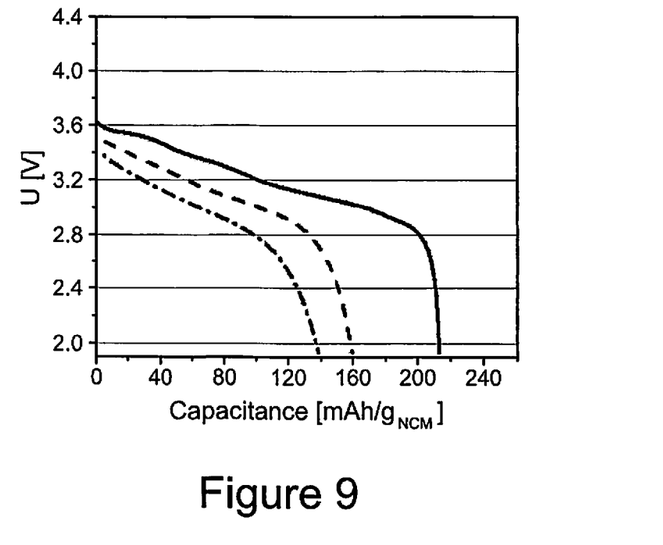
FIG. 9 the discharge voltage profile of the test cell having a binder content of 1 weight percent in a representation corresponding to FIG. 5.

Respective discharge voltage profiles of test cells of the described solid state battery are shown in FIGS. 5 to 9. A respective electrical voltage is entered over the capacitance here. In FIG. 5, the proportion of polytetrafluoroethylene amounts to 0 weight percent; in FIG. 6, 0.1 weight percent; in FIG. 7, 0.3 weight percent; in FIG. 8, 0.7 weight percent; and in FIG. 10, 1 weight percent.

Figure 10:
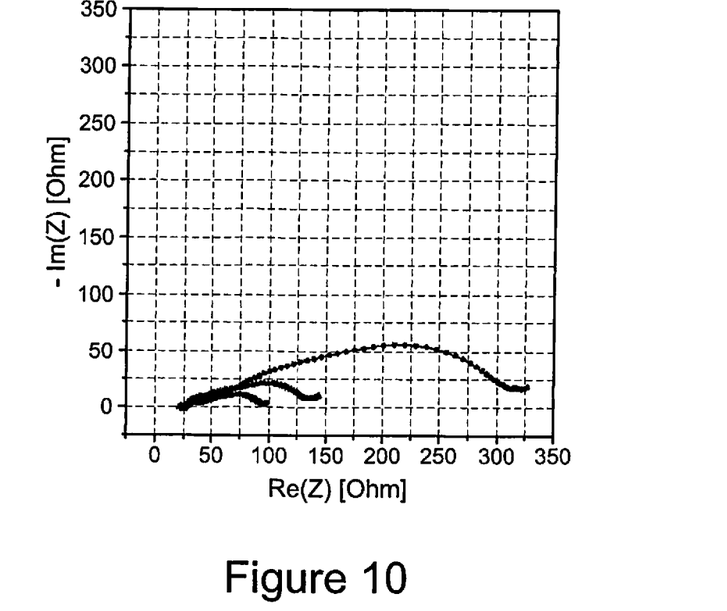
FIG. 10 a Nyquist diagram of the internal resistance of the test cell.

In FIG. 10, an impedance measurement in which an imaginary portion is entered over a real portion is shown in a Nyquist diagram. The measurement curves show a test cell having a binder portion of 0.1 weight percent, 0.3 weight percent, and 1 weight percent. The internal resistance of the respective solid state battery increases as the proportion of polytetrafluoroethylene increases.

Embodiments disclosed only in the embodiment examples can be combined with one another and claimed individually.

The invention claimed is:

1. A cathode unit for a solid state battery comprising a layer composed of a composite material that has an electrode material, a solid electrolyte material, an electrically conductive additive, and polytetrafluoroethylene as a binding agent,
    the composite material comprises from 0.1 weight percent to less than 0.5 weight percent polytetrafluoroethylene; and
    the polytetrafluoroethylene is at least partially present as fibrillated polytetrafluoroethylene.

2. The cathode unit in accordance with claim 1, wherein the composite material comprises the electrode material in an amount of 60 weight percent to 99 weight percent.

3. The cathode unit in accordance with claim 1, wherein the electrode material comprises $LiCoO_2$, $LiNiO_2$, $LiNi_{1-x}Co_xO_2$, $LiFePO_4$, $LiMnO_2$, $LiMn_2O_4$, $Li_2Mn_3NiO_8$, $LiNi_xCo_yMn_zO_2$, $LiNi_xCo_yAl_zO_2$ (where x+y+z=1), $Li_4Ti_5O_{12}$, $Li_2FeSiO_4$, $Na_2S$, $Na_xMnO_2$, $Na_3V_2(PO_4)_3$, $NaFePO_4$, $Na_2FePO_4F$, $NaNiMnO_2$, $Na_2TiO_7$ or $Na-Ti_2(PO_4)_3$ or a mixture thereof.

4. The cathode unit in accordance with claim 1, wherein the solid electrolyte material comprises a material of the system $Li_2S-P_2S_5$, $Li_2S-GeS_2$, $Li_2S-B_2S_3$, $Li_6PS_5Cl$, $Li_2S-SiS_2$, $Li_2S-P_2S_5-LiX$ (X=Cl, Br, I), $Li_2S-P_2S_5-Li_2O$, $Li_2S-P_2S_5-Li_2O$-LiI, $Li_2S-SiS_2$-LiI, $Li_2S-SiS_2$-LiBr, $Li_2S-SiS_2$-LiCl, $Li_2S-SiS_2-B_2S_3$-LiI, $Li_2S-SiS_2-P_2S_5$-LiI, $Li_2S-P_2S_5-Z_mS_n$ (where m and n are whole numbers and M is selected from P, Si or Ge), $Li_2S-SiS_2-Li_3PO_4$, $Li_2S-SiS_2-Li_pMO_q$ (where p and q are whole numbers and M is selected from P, Si or Ge), $Na_2S-P_2S_5$, $Na_2S-GeS_2$, $Na_2S-B_2S_3$, $Na_6PS_5Cl$, $Na_2S-SiS_2$, $Na_2S-P_2S_5$-NaX (X=Cl, Br, I), $Na_2S-P_2S_5-Na_2O$, $Na_2S-P_2S_5-Na_2O$-NaI, $Na_2S-SiS_2$-NaI, $Na_2S$—$SiS_2$—NaBr, $Na_2S$—$SiS_2$—NaCl, $Na_2S$—$SiS_2$—$B_2S_3$-NaI, $Na_2S$—$SiS_2$—$P_2S_5$-NaI, $Na_2S$—$P_2S_5$—$Z_mS_n$ (where m and n are whole numbers and M is selected from P, Si or Ge), $Na_2S$—$SiS_2$—$Na_3PO_4$, $Na_2S$—$SiS_2$—$Na_pMO_q$ (where p and q are whole numbers and M is selected from P, Si or Ge) or a mixture thereof.

5. The cathode unit in accordance with claim 1, wherein the cathode unit further comprising a current collector wherein the current collector comprises aluminum or is formed from aluminum or is formed as a current collector layer having a double-sided coating, as an expanded metal, as a woven fabric, or as a current collector layer provided with a primer layer.

6. The cathode unit in accordance with claim 1, wherein the composite material is solvent free.

7. The cathode unit in accordance with claim 1, wherein the polytetrafluoroethylene is present as a completely monoaxially or completely biaxially oriented polytetrafluoroethylene.

8. The cathode unit in accordance with claim 1, wherein the electrode material comprises a protective layer applied to particles of the electrode material.

9. The cathode unit in accordance with claim 8, wherein the protective layer comprises $Li_2O$—$ZrO_2$.

10. A solid state battery having the cathode unit in accordance with claim 1.

11. A method of producing a cathode unit for a solid state battery, comprising
   producing a powder mixture from an electrode material, a solid electrolyte material, an electrically conductive additive, and polytetrafluoroethylene as a binding agent, wherein the powder mixture comprises from 0.1 weight percent to less than 0.5 weight percent polytetrafluoroethylene; and
   producing at least partially fibrillated polytetrafluoroethylene in the powder mixture by the action of shear forces on the powder mixture, and shaping the powder mixture into a flexible composite layer.

12. The method in accordance with claim 11, wherein the producing the at least partially fibrillated polytetrafluoroethylene is carried out by grinding, blending in a worm shaft or in a calender roll device, a kneading device, a mortar device, or a combination thereof.

13. The method in accordance with claim 11, wherein the shaping of the powder mixture into the flexible composite layer is carried out by rolling, pressing, or extrusion.

14. The method in accordance with claim 11, wherein the forming of the flexible composite layer to a current collector layer is carried out by lamination at temperatures between 60° C. and 120° C.

* * * * *